May 8, 1928.  1,669,227
J. M. BLAUSER
SLIDING DOOR FASTENING MECHANISM FOR VEHICLE BODIES
Filed Oct. 4, 1924
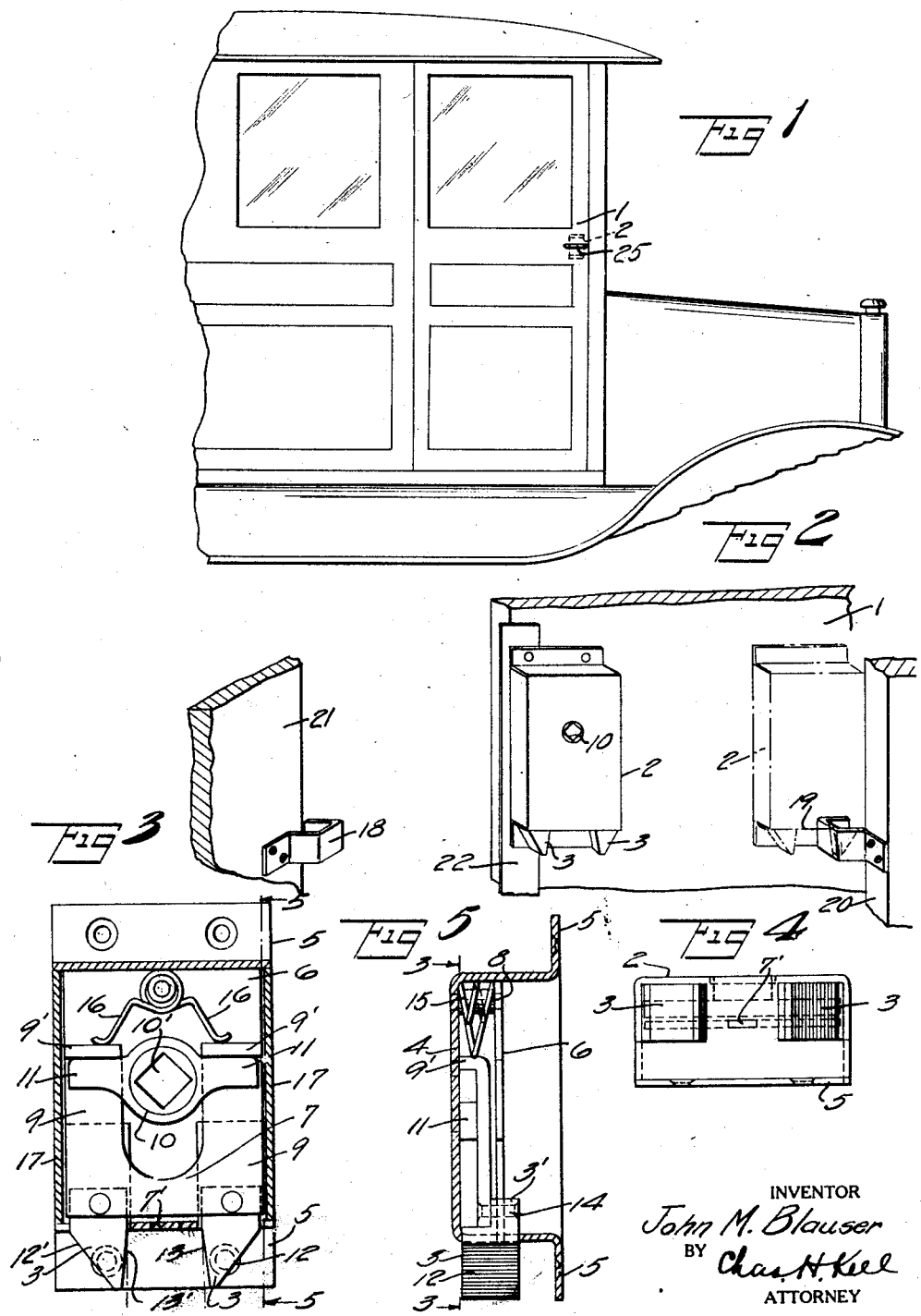
INVENTOR
John M. Blauser
BY Chas. H. Keel
ATTORNEY Patented May 8, 1928.

1,669,227

UNITED STATES PATENT OFFICE.

JOHN M. BLAUSER, OF YORK, PENNSYLVANIA, ASSIGNOR TO MARTIN-PARRY CORPORATION, OF YORK, PENNSYLVANIA, A CORPORATION OF DELAWARE.

SLIDING-DOOR-FASTENING MECHANISM FOR VEHICLE BODIES.

Application filed October 4, 1924. Serial No. 741,526.

This invention relates to fastening, closing and opening mechanisms for motor vehicles body sliding doors, particularly for sliding doors for highway vehicles.

The object of the invention generally is a fastening mechanism for sliding doors for highway vehicles by which a more effective closing and opening of such doors and a more certain fastening thereof in the open and closed positions may be secured than has hitherto been possible, and particularly a novel form and structure of fastening mechanism in which the rattling and other noises usually present in prior vehicle body doors and door fastening mechanisms are avoided or substantially reduced. A further object of the invention is a novel mechanism of this character which is of simple construction and may be economically manufactured in quantity production and readily assembled on commercial vehicle bodies.

For a better understanding of the invention reference may be had to the accompanying drawings forming a part of this application, wherein:

Fig. 1 is a side view of a portion of a motor vehicle body embodying my invention.

Fig. 2 is an enlarged view of a portion of the door and opening and closing mechanisms.

Fig. 3 is a sectional view along the line 3—3 of Fig. 5.

Fig. 4 is an end view thereof.

Fig. 5 is a sectional view along line 5—5 of Fig. 3.

Referring to the drawings, I have indicated a commercial vehicle body embodying my invention and including a horizontally slidable side door 1, the latter forming a closure for the driver's vestibuled cabin. This sliding closure 1 may be suspended or mounted in any suitable manner to slide back and forth on the side of the body. In its forward or closed position it is adapted to engage the windshield frame member 21 and to be positively locked thereagainst and in its opening movement it is adapted to be arrested and locked in the open position.

The locking and fastening mechanism includes a casing 2 which is attached to the interior of the door 1 adjacent the forward edge thereof and contains a vertically slidable U-shaped double locking and fastening member 3, the latter projecting through one end of the casing 2, as for example as illustrated in the drawing, the lower end thereof. The casing 2 comprises a main body member 4 (Fig. 5) formed from a single piece of sheet metal or other suitable material and having the vertically turned and aligned attaching feet 5. The latter are provided with openings to receive suitable attaching screws or devices. The main casing member 4 carries on the inside thereof a plate 6 which is cut away on either side at the lower end thereof to clear the reciprocating U-shaped member 3 and to form a tongue 7. This plate 6 is carried by and spaced from the front wall of the main casing member 4 by means of an attaching and spacing member 8 and also by means of a rabbeted connection 7' with the bottom wall of the main casing member 4. The plate 6 and the face member 4, therefore, form a vertical chamber for the reception of a carrier for the U-shaped vertically slidable member 3. This carrier is in the form of a plate having a pair of upwardly extending carrier arms 9 which straddle a rotary member 10. The latter is suitably journaled in the body member 4 and fixedly carries the two oppositely extending horizontal arms 11 which engage respectively the under surfaces of the horizontally turned ends 9' of the arms 9. The U-shaped member consists of the two similar but reversely formed members 3 which are attached to the bottom of the carrier 9 to form the legs of the U. The rear leg 3 is provided with a beveled rear or outer edge 12 and a front edge 13. The front leg 3 is provided with a forward edge 12' similar to the rear edge 12 of the rear leg. In like manner the front member or leg 3 is provided with a rear edge 13' similar to the front edge 13 of the rear leg. The inner edges 13, 13' are slightly inclined oppositely to the inclinations respectively of the edges 12 and 12' so as to form a slightly divergent opening between the legs 3 of the U-shaped member for a purpose hereinafter described. The legs 3 are preferably made separate from the carrier 9 and attached thereto in any suitable manner. In the particular embodiment illustrated each member 3 abuts against the under surface of the carrier 9 and is provided with a vertically extending attaching portion 3' which is fitted against and attached to the back of the carrier 9 with a suitable attaching rivet or equivalent device 14 passing therethrough.

The U-shaped vertically reciprocable member 3 automatically drops into its normally operative position by the effect of gravity, but in order to avoid sticking and to obviate or reduce the effect of the vertically accelerating forces thereon and to thereby reduce the tendency to chatter and the noise consequent thereupon, I have provided a coil spring 15 which surrounds the attaching and spacing member 8 and has the two oppositely extending arms 16 which bear upon and rest in recesses formed on the outer surfaces of the horizontally turned ends 9' of the carrier arms 9. This spring should have sufficient tension and operative force to counteract the vertically accelerating forces which constitute one of the problems to be met in the design of spring supported and vertically movable parts of highway vehicles. For example, such spring tension should be at least three times the weight of the reciprocable mechanism including the U-shaped member 3 and preferably should be as great as five times the weight or gravity effect of the reciprocable parts. The spring also serves the function of cooperating with the beveled edges 13, 13' to take up clearances in the longitudinal direction, as described below. The recesses in the upper portions of the horizontally turned ends 9' perform the function of centering the spring 15, 16. The casing, in addition to the main casing part 4 has side closures 17 which may be attached thereto in any suitable manner.

The locking and fastening mechanism, including the U-shaped member 3, cooperates with the stationary catches or keepers 18 and 19, carried respectively by the windshield member 21 and by the body frame member 20. These members 18 and 19 may be formed from straight metallic blanks and bent into the U-shaped form indicated. They are attached in any suitable manner to the door jamb members 21 and 20 so as to be disposed in the path of the legs of the U-shaped member 3. In the closed position the U-shaped member 3 straddles the catch 18 and on account of the slightly beveled inner edge 13' the tension of spring 15, 16 tends, by the cam or wedging action of the edge 13' against the keeper 18, to take up any clearance or lost motion in the door mechanism and to effect and noiselessly maintain a tight closure of the door. Similarly in the open position the U-shaped member 3 straddles the keeper 19 and in this position the beveled or cam edge 13 comes into action by means of the force applied by the spring to firmly hold the door in a non-rattling manner in the open position. The U-shaped member 3 is provided with the beveled-off outer edges 12 and 12' so as to automatically ride over the keepers 19 and 18 when the door is moved to the open or closed position. The rotary member 10 is illustrated as having an opening or socket 10' of square formation which is adapted to receive a key or operating member 25 indicated in Fig. 1 having a square section whereby such key or handle may be readily inserted and by turning in either direction utilized to lift the U-shaped straddling member 3 against the tension of the spring 15, 16 from locking engagement with the keepers 18 and 19, one or the other of the actuating or lifting members 11 engaging the ends 9' of the carrier depending upon the direction of turning. A weather strip 22 may be provided on the interior of the front edge of the sliding door.

The fastening mechanism thus described forms a firm and certain opening and closing for highway vehicle sliding doors, and is peculiarly free from chattering and rattling noises usually present in prior mechanisms. Moreover, the mechanism set forth is of simple construction and of few parts, all of which are of a form capable of being economically manufactured on a quantity production basis and readily assembled on slender commercial body doors with a minimum of disfiguration or weakening thereof. The mechanism takes up a minimum amount of space and by reason of the particular construction and arrangement thereof permits the use of substantially the whole door space in the open position, with the certain and positive fastening in both open and closed positions.

Having thus described my invention, what I claim and desire to protect by Letters Patent is:

1. In a motor vehicle sliding door fastening mechanism including a pair of keepers carried on opposite sides of the door frame, a U-shaped vertically slidable securing member carried by the door near the forward edge thereof and adapted to cooperate with and straddle either of said keepers to firmly fasten and hold the door only in the closed or open position, a spring mechanism pressing the U-shaped securing member vertically and firmly against a seat with its legs in line with the keepers, said U-shaped member having its two legs beveled off at their outer edges so as to yieldingly and automatically ride on and over into fastening engagement with the keeper against the pressure of the spring mechanism in either direction of movement when approaching the closed and opened positions of the door and a rotating actuating member adapted to vertically move the U-shaped securing member from straddling relation with and out of the path of the keepers against the tension of the spring mechanism.

2. A motor vehicle sliding door fastening mechanism including a pair of catches carried by the vertical door frame members on opposite sides of the door opening, a U-shaped vertically reciprocable securing member carried by the door and adapted to co-operate with and straddle either of said keepers to firmly fasten and hold the door only in the closed or open position, a spring mechanism pressing the U-shaped securing member vertically and firmly against its seat with the legs of the U-shaped member disposed in line with the keepers, said U-shaped member having its two legs beveled off on their outer edges so as to yieldingly and automatically ride on and over the keepers against the pressure of the spring mechanism in either direction of movement of the door when approaching the closed and opened positions, and firmly fasten and hold the door in either of these positions, said U-shaped member having the inner edges of its two legs slightly inclined to the vertical and diverging in an outward direction so as to have a wedging and locking action against the keepers under the pressure of the spring mechanism, and an oscillating actuating member adapted to engage and move the U-shaped securing member from straddling relation with and out of alinement with the keepers against the tension of the spring mechanism in either direction of oscillating movement of the handle member.

3. A motor vehicle sliding door non-rattling fastening mechanism comprising an inverted U-shaped vertically reciprocatable securing member carried by the door and adapted to cooperate with and straddle either of a pair of keepers carried by the vertical door framing members, a spring mechanism pressing the U-shaped securing member vertically and firmly against its seat with the legs of the U-shaped member disposed in line with the keepers and with a force at least three times as large as the weight of the said member, said U-shaped securing member having its two legs beveled off on their outer edges to form cams so as to automatically ride on and over the keepers in straddling relation therewith against the pressure of the spring mechanism in either direction of movement when approaching the closed and opened positions of the door, said U-shaped member also having the inner edges of its two legs slightly inclined to the vertical and outwardly diverging so as to wedgingly engage the keepers to automatically take up any clearance therebetween and to securely fasten the door against displacement and rattling in either position, and a rotating handle actuating member adapted to actuate the U-shaped securing member from its straddling relation with and out of alinement with the keepers against the tension of the spring mechanism in either direction of movement of the handle member.

4. In a mechanism of the character set forth in claim 1 is which the U-shaped member is provided with a pair of operating arms straddling an oscillatable shaft and engaged by a pair of actuating members carried thereby, the spring mechanism yieldingly pressing against both of said operating arms and having parts resting in centering recesses formed therein.

5. In a vehicle door mechanism, the combination of a door frame including a front door jamb, and a rear door jamb, a door slidably mounted on the side thereof and adapted to be firmly fastened and held with respect thereto in the open and closed positions, a keeper secured to the front door jamb, a similar keeper secured to the rear door jamb, a fastening mechanism secured to and carried by said door near the forward edge thereof including a sliding multiple head bolt, one head for the front keeper and one head for the rear keeper, each of said bolt heads being beveled on their outer edges to yieldingly strike and ride over into fastening engagement with only its cooperating catch, and each of them being also beveled on its inner edge to function as a spring pressed self-locking wedge against its co-operating catch to take up clearances and prevent rattling of the doors, and means for retracting said bolt against the spring pressure.

6. In a vehicle door fastening mechanism, the combination of a door frame including a front door jamb and a rear door jamb, a door slidably mounted on the side thereof and adapted to be firmly fastened and held with respect thereto in the open and closed positions, a keeper secured to the front door jamb, a similar keeper secured to the rear door jamb, a fastening mechanism secured to and carried by said door on the forward edge thereof and including a sliding multiple head bolt, one head for the front keeper and one head for the rear keeper, said bolt heads forming in the fastening position a U-shaped member straddling a keeper, the bolt head for the front keeper being beveled on its front edge or face to yieldingly strike and ride over into fastening engagement with its cooperating keeper to fasten the door in closed position when the door is moved to the closed position against the door jamb, the other bolt head being beveled on its rearward edge or face so as to yieldingly strike or ride over into fastening engagement with the rear keeper to firmly fasten and hold the door in the open position when the door is moved to the open position and means for retracting said bolt against the spring pressure.

In testimony whereof, I have signed my name to this specification.

JOHN M. BLAUSER.

CERTIFICATE OF CORRECTION.

Patent No. 1,669,227.  Granted May 8, 1928, to

JOHN M. BLAUSER.

It is hereby certified that error appears in the printed specification of the above numbered patent requiring correction as follows: Page 2, line 127, claim 2, for the word "catches" read "keepers"; page 3, line 64, claim 4, for the word "is" read "in"; and that the said Letters Patent should be read with these corrections therein that the same may conform to the record of the case in the Patent Office.

Signed and sealed this 29th day of May, A. D. 1928.

(Seal)  M. J. Moore,
Acting Commissioner of Patents.